No. 638,585. Patented Dec. 5, 1899.
J. MANN.
FRUIT OR VEGETABLE CLEANER AND GRADER.
(Application filed June 14, 1899.)
(No Model.)
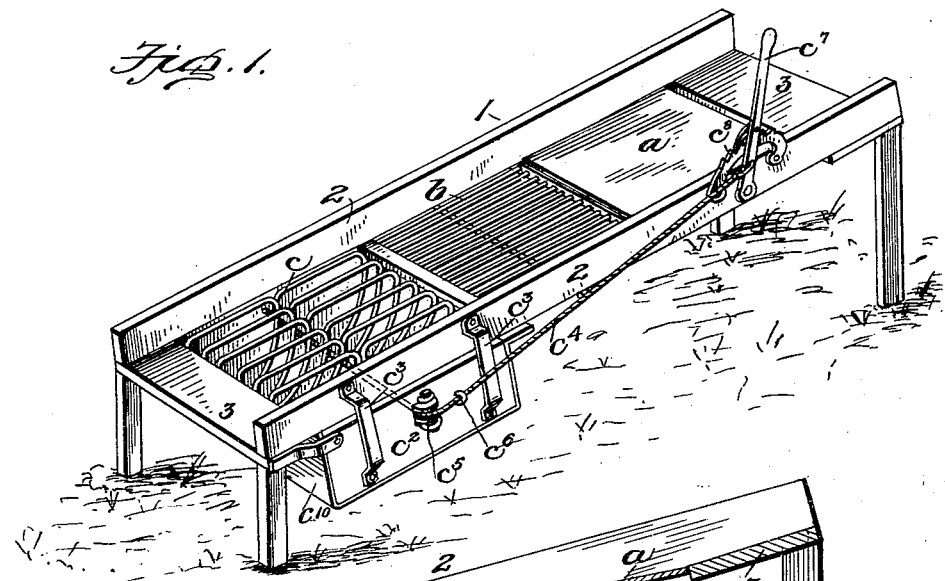
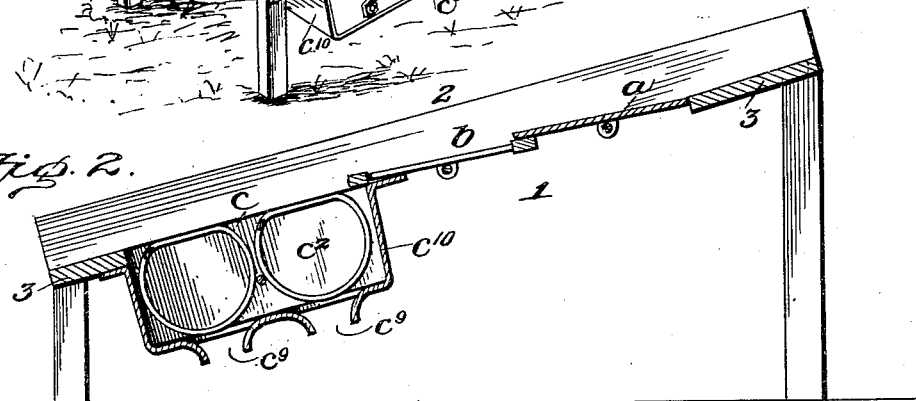
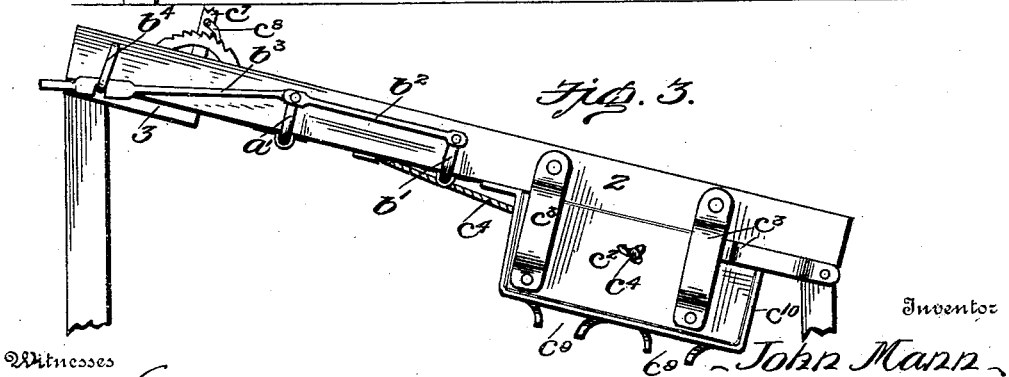
Inventor
John Mann
Witnesses
by H. B. Wilson & Co.
Attorneys

UNITED STATES PATENT OFFICE.

JOHN MANN, OF BUTTE CITY, CALIFORNIA.

FRUIT OR VEGETABLE CLEANER AND GRADER.

SPECIFICATION forming part of Letters Patent No. 638,585, dated December 5, 1899.

Application filed June 14, 1899. Serial No. 720,568. (No model.)

*To all whom it may concern:*

Be it known that I, JOHN MANN, a citizen of the United States, residing at Butte City, in the county of Glenn and State of California, have invented certain new and useful Improvements in Fruit or Vegetable Cleaners and Graders; and I do declare the following to be a full, clear, and exact description of the invention, such as will enable others skilled in the art to which it appertains to make and use the same.

The invention has relation to fruit and vegetable cleaners and graders.

The object of the invention is to provide a device of this character which shall be simple of construction, durable in use, and comparatively inexpensive of production and which may be quickly cleaned of all foreign matter, such as sand and leaves, and which may also be adjusted to grade fruits and vegetables of different sizes.

With this object in view the invention consists in certain features of construction and combination of parts, which will be hereinafter fully described and claimed.

In the accompanying drawings, Figure 1 is a perspective view of my improved fruit and vegetable grader. Fig. 2 is a longitudinal sectional view. Fig. 3 is a side elevation.

Like characters of reference denote like parts in the several views of the drawings.

1 denotes the inclined trough, consisting of the side pieces 2, the end pieces 3, and the sections $a\,b\,c$, forming, respectively, the dump-board, the dump-screen, and the compressible screen, and, with the end pieces, constitute the bottom of the trough. The dump-board $a$ is journaled in the side pieces of the frame, as shown, and is provided with a crank-arm $a'$. The dump-screen $b$ is likewise journaled in the frame and is provided with a similar crank-arm $b'$, which two are connected by a link $b^2$, which in turn is connected to an operating-rod $b^3$, by means of which the dump-board and dump-screen are tilted to discharge from their surfaces any accumulation of foreign matter, such as leaves, sand, and the like. The rod is provided with a notch in its end which is adapted to engage the catch-staple $b^4$, and thus hold the screen and dump-board in their proper position when the device is in use. The compressible screen $c$ is composed of one or more transversely-arranged spiral springs. In the present instance I have shown two, the spaces between the coils of the upper being preferably narrower than the spaces between the coils of the lower one. Each coil of said springs has a flat elongated upper surface, so as to present a smooth unobstructed passage for the fruit or vegetables along the bottom of the trough.

$c^2$ denotes heads to which the ends of the springs are secured, as shown in Fig. 2. These heads are connected to the lower ends of the side pieces of the trough by bulged straps $c^3$, which permit of the heads swinging under the edges of the trough. $c^4$ denotes a rope or cable connected to one of the heads and thence crossing underneath the side pieces of the trough and passing through an aperture in the opposite head and engaging a sheave $c^5$, journaled in said head. This rope or cable extends from the sheave through a guide-staple $c^6$ and is connected to a lever $c^7$, which is adapted to engage a segmental rack $c^8$. This construction permits of the adjustment of the springs to vary the spaces between the coils, so as to permit fruits or vegetables of smaller character being graded, as well as to loosen any fruit which may have been caught fast between the coils and clogged the grader.

In operation the fruits or vegetables are thrown upon the dump-board and rolled therefrom onto the screen, which separates them from sand, leaves, and the like. The fruits or vegetables now pass upon the compressible screen, the smaller sizes falling through the upper section of the compressible screen and the intermediate size through the lower section and are discharged from the spouts $c^9$ of an inclosing casing $c^{10}$ into suitable receptacles, while the larger articles roll off the end of the trough into any suitable receptacle placed in position to receive them.

Having thus described the invention, what is claimed, and desired to be secured by Letters Patent, is—

1. A grader comprising a trough having an opening in its bottom and a screen arranged in said opening, said screen being formed of compressible coils of wire, each of said coils having a flat elongated upper surface, substantially as and for the purpose set forth.

2. A grader comprising a trough, a hinged dump-board and a hinged screen, crank-arms secured to the dump-board and screen, a link connecting the crank-arms, an operating-lever for said crank-arms, and a catch for said operating-lever secured to the side of the trough, substantially as and for the purpose set forth.

In testimony whereof I have hereunto set my hand in presence of two subscribing witnesses.

JOHN MANN.

Witnesses:
B. H. BURTON,
C. R. WICKES.